Jan. 16, 1923.
J. MOSS.
MACHINE FOR PREPARING FIBROUS MATERIAL.
FILED MAY 13, 1922.
1,442,534
3 SHEETS-SHEET 1
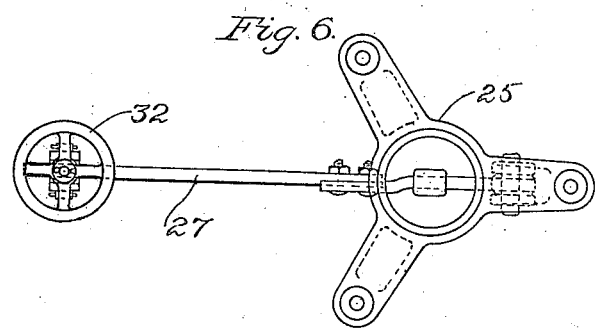
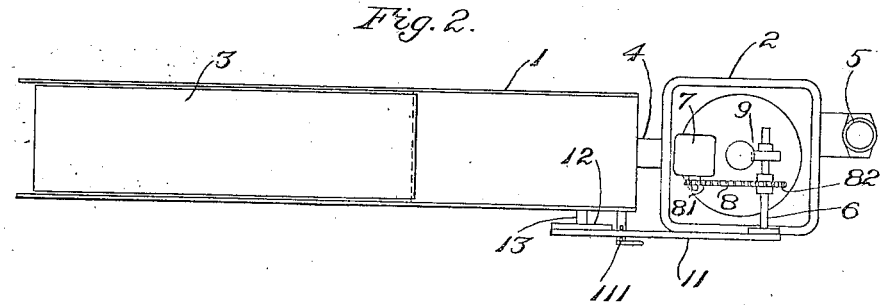
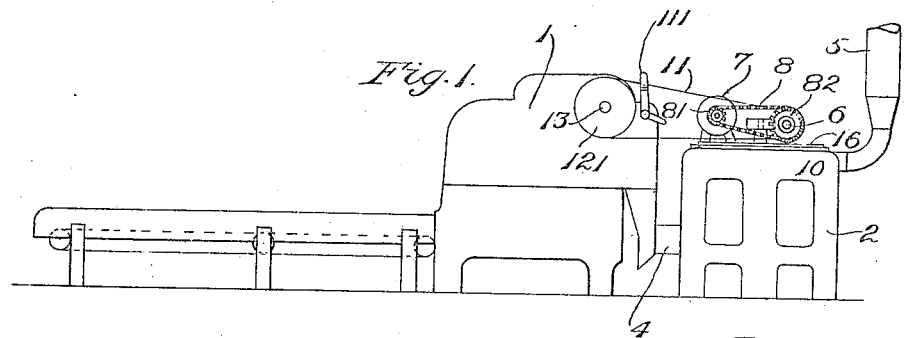
Witness:
Oscar F. Hill
Inventor:
Joseph Moss
By Chas. F. Randall
Attorney.

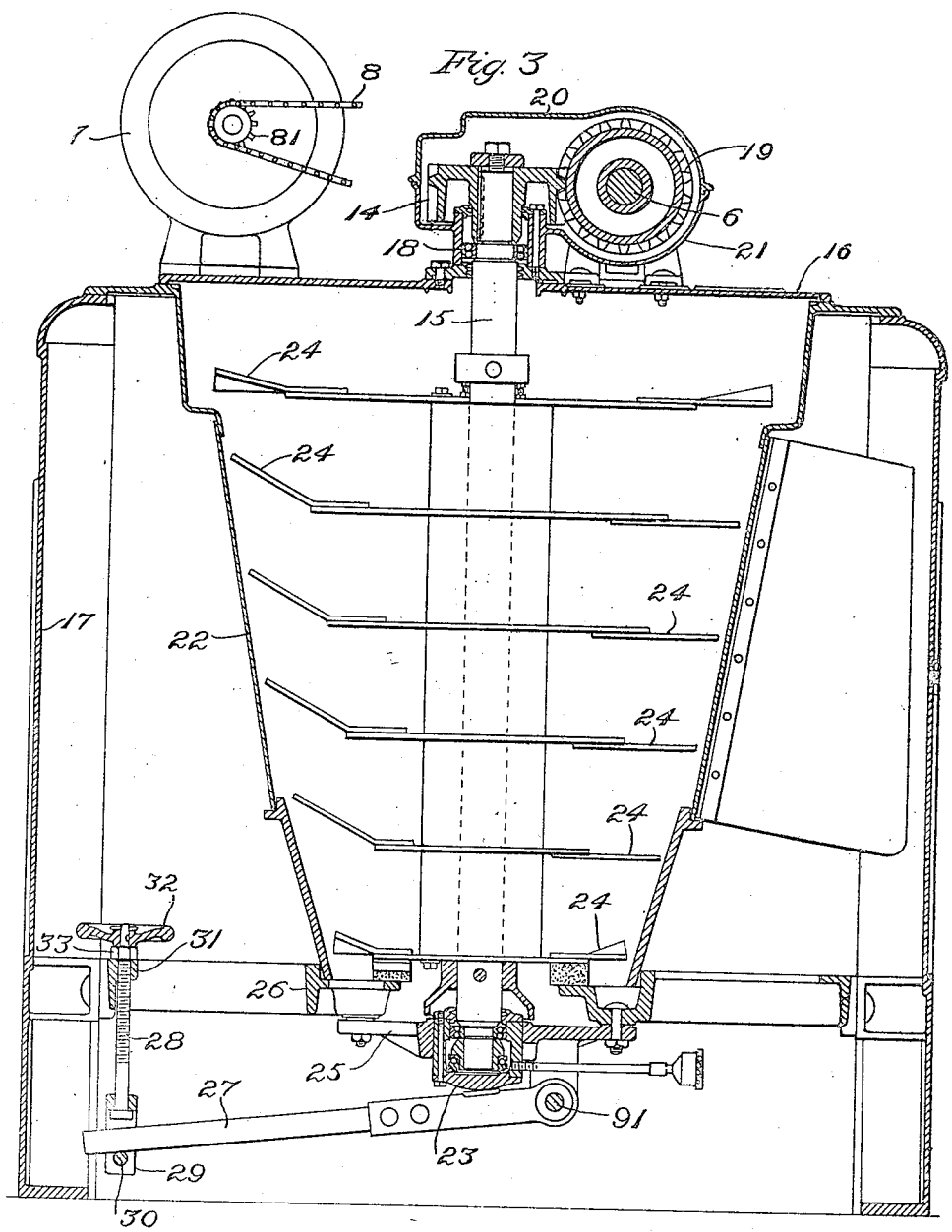

Jan. 16, 1923.

J. MOSS.
MACHINE FOR PREPARING FIBROUS MATERIAL.
FILED MAY 13, 1922.

Witness:
Oscar F. Hill

Inventor.
Joseph Moss
By Chas. F. Randall
Attorney.

Patented Jan. 16, 1923.

1,442,534

UNITED STATES PATENT OFFICE.

JOSEPH MOSS, OF WOONSOCKET, RHODE ISLAND, ASSIGNOR TO WOONSOCKET MACHINE & PRESS CO., INC., OF WOONSOCKET, RHODE ISLAND, A CORPORATION OF RHODE ISLAND.

MACHINE FOR PREPARING FIBROUS MATERIAL.

Application filed May 13, 1922. Serial No. 560,739.

*To all whom it may concern:*

Be it known that I, JOSEPH MOSS, a citizen of the United States, residing at Woonsocket, in the county of Providence, State of Rhode Island, have invented a certain new and useful Improvement in Machines for Preparing Fibrous Materials, of which the following is a specification, reference being had therein to the accompanying drawings.

The features of the invention are designed for application to bale breakers and upright or vertical openers employed in the preparation of cotton fibers for spinning. The said features comprise, firstly, improvements in the driving mechanism of the said machines; and secondly, an improvement in connection with the means for adjusting the conical so-called "cylinder" of an opener of the said class longitudinally for the purpose of regulating the closeness of approach of the extremities of its beater-arms to the inner surface of the shell within which such cylinder revolves.

The invention provides improved driving connections for an upright or vertical opener and a bale-breaker associated therewith, such driving connections comprising a jack-shaft in direct and positive gear-engagement with the opener-cylinder, and means for actuating the bale-breaker from the said jack-shaft. It further provides a spiral-gear drive for an upright opener cylinder. It provides, also, cylinder-adjusting or setting mechanism which in its entirety is contained within the opener-casing and is protected thereby.

An illustrative embodiment of the invention is shown in the drawings, in which latter,—

Fig. 1, Sheet 1, shows in side elevation an upright or vertical opener and associated bale-breaker, with the features of the invention applied in connection therewith.

Fig. 2, Sheet 1, is a plan of the parts which are shown in Fig. 1.

Fig. 3, Sheet 2, is a view in vertical transverse section of the said upright or vertical opener, showing the direct and positive gear-drive between the jack-shaft and the cylinder, in this instance the spiral-gear drive which is involved as a specific feature of the invention, and cylinder-adjusting means according to another feature of the invention.

Fig. 4, Sheet 3, is a view in similar section of some of the parts at the upper end of the cylinder, shown on a larger scale than Fig. 2.

Fig. 6 shows in plan the spider at the lower end of the cylinder, and the adjustment devices to which reference is made hereinafter.

Figure 5:
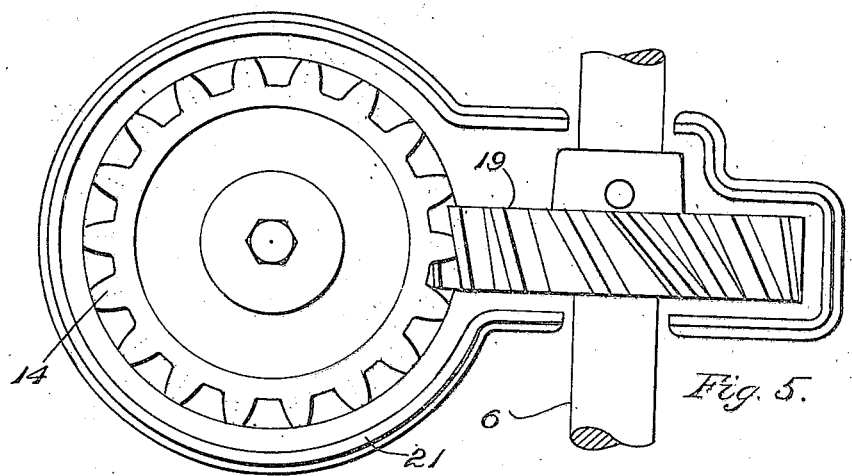
Fig. 5 shows certain of the said parts in horizontal section, on the same larger scale.

Figs. 1 and 2 represent, more or less diagrammatically, a bale-breaker 1 and a vertical opener 2, the feed-apron of the bale-breaker being represented at 3, Fig. 2, the connecting flue between the two machines being indicated at 4, and at 5 is shown the flue through which the cotton after having been operated upon by each of the two machines in succession is conducted to the succeeding part of a mill equipment.

In usual practice heretofore, it has been the rule to actuate the working parts of the bale-breaker and vertical opener by means of driving power applied primarily to a shaft of the bale-breaker and transmitted secondarily from a bale-breaker shaft to the cylinder shaft by means of a driving band or rope and suitable pulleys, etc. Stated more specifically, in usual practice the driving power is transmitted first to the working parts of the bale-breaker, and from a large band-pulley on a horizontal shaft of the bale-breaker power is transmitted to the upright cylinder of the opener, for the purpose of rotating such cylinder, by means of a band or rope that is deflected by means of guide-sheaves so as to pass around a horizontally disposed band-pulley on the upper end of the cylinder shaft. Aside from objections which are incident to this mode of driving a cylinder, there is inherent in this customary mode and means of actuating the associated bale-breaker and upright opener cylinder the objectionable feature that the driving power for the opener cylinder is transmitted through the weaker machine of the two. A source of inconvenience is the liability of the belt or rope to fall off one of the pulleys around which it travels, when it is slack, in starting up the machine, or in case the machine should clog, as when the suction is not sufficient to draw the fibrous material away from the cylinder and its casing at a rate properly corresponding with the rate at which the material is fed into the machine.

In accordance with the invention, I mount a jack-shaft 6 suitably at the top of the upright opener 2, with its length extending crosswise of the machine. I make suitable provision for the application of driving power to the said jack-shaft. This may be, if desired, by means of a pulley upon the jack-shaft, and a driving band applied to the said pulley. Preferably, however, I provide an individual drive comprising an electric motor 7, conveniently mounted upon the top plate 16 of the main casing 17 of the opener, and connected with the jack-shaft 6 by suitable power-transmitting means, as for instance a sprocket chain 8 and sprocket-wheels 81, 82. By means of gear connections at 9 I place the jack-shaft in direct and positive gear-engagement with the shaft of the opener cylinder, and thereby with the said cylinder. I transmit driving power from the jack-shaft 6 to the shafting of the bale-breaker, to actuate thereby the working parts of the bale-breaker. In this instance, a band-pulley 10 is mounted on the jack-shaft 6, fast and loose pulleys 12, 121, are mounted on a shaft 13 of the bale-breaker, and a driving band 11 controlled by a belt-shipper 111 extends from pulley 10 to the pulleys 12, 121. The use of fast and loose pulleys enables the opener to be started up before the bale-breaker is started, thus permitting the cylinder of the opener to be set in rotation and to acquire proper speed before material enters the opener from the bale-breaker. Clogging of the opener thereby is avoided.

As will be apparent from the foregoing explanation, actuating power is applied primarily to the jack-shaft 6, the latter being in direct and positive gear-engagement with the opener cylinder, and the bale-breaker, is actuated from the said jack-shaft through the intermediate connections.

The horizontal jack-shaft in positive gear-driving engagement with the cylinder-shaft is an important factor. In the first place, it provides for driving the cylinder through connections with an overhead countershaft or a motor. A second important factor is the fact of driving the bale-breaker from the said jack-shaft. The features of utilizing as a motive-power shaft the horizontally extending jack-shaft, with positive gear connection between such shaft and the upright cylinder, and with other driving connections intermediate the jack-shaft and the bale-breaker, remedy several important drawbacks and disadvantages of the usual means and mode of actuating or driving a bale-breaker and the associated upright opener.

The cylinder of an upright opener is rotated at a high rate of speed by its driving devices. Customarily, as stated, a band and pulley, or rope and pulley, arrangement is employed, with a pulley fixed upon the upper end of the cylinder shaft (revolving in a horizontal plane) and with suitable guide-sheaves or rolls arranged to conduct to and from the said pulley a band or rope from a pulley revolving in a vertical plane, mounted on a shaft of the bale-breaker. In operation, there is more or less slip of the driving band or rope; there is considerable wear and tear of the driving band or rope, and sometimes it leaves the cylinder shaft pulley, it being difficult to attain the right position and inclination of the guide-sheaves or rolls by the adjustment devices which are provided in connection with the guide-sheaves or rolls. The relations between the pulley on the cylinder shaft and the guide-sheaves or rolls are disturbed by vertical adjustments of the cylinder, by reason of the fact that such vertical adjustments raise or lower the said pulley relative to the guide-sheaves or rolls, necessitating compensating adjustment of the latter, which is not always correctly and satisfactorily effected. The second feature of my invention, namely my spiral gear-drive for the opener cylinder, is free from the drawbacks and objections of the mode and means of driving said cylinder as set forth above, and remedies the faults and deficiencies thereof. It has a smooth and easy, but positive, driving action.

Figure 4:
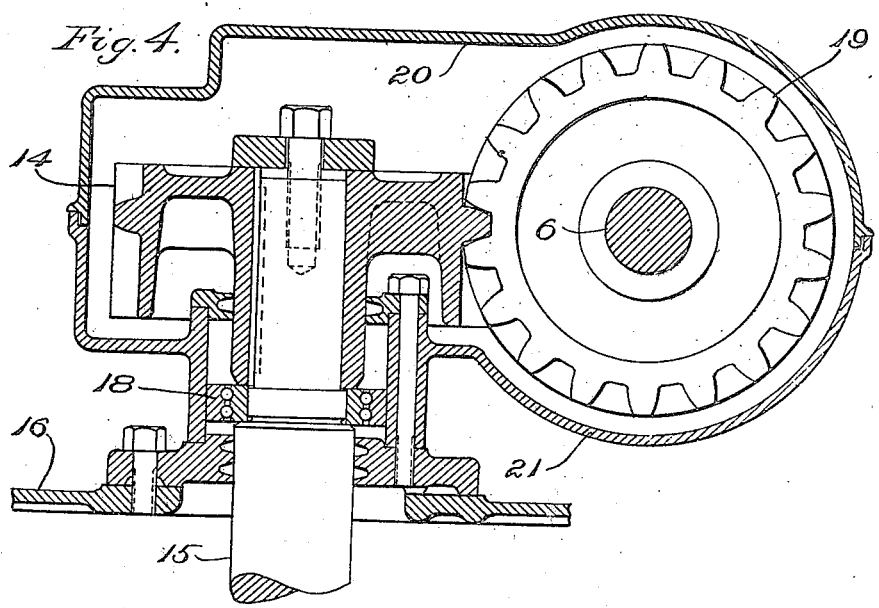

The form of the said spiral gear-drive that is shown in the drawings, Figs. 3, 4, and 5, comprises a broad-faced spiral gear 14 that is fixed upon the upper end of the cylinder shaft 15, above the top plate 16 of the cylinder casing 17, and also above the top of the bolster bearing 18 of the cylinder shaft; and a driving spiral gear 19 fixed upon the jack-shaft 6. In addition to the smooth and easy, positive driving action, the spiral gearing has the advantage that the broad face of the driven spiral gear 14 enables the latter to rise or lower in unison with the cylinder and cylinder shaft, throughout the usual range of vertical workings adjustments of the cylinder, without disturbing the driving relations between the two intermeshing spiral gears 14 and 19.

The spiral gearing is surrounded by a casing, the top portion or cap 20 of which is divided from the lower portion of body 21 along a horizontal line, and removably applied to the said lower portion or body. The bottom of the said casing is adapted to contain the requisite quantity of lubricant to keep the intermeshing portions of the two spiral gears well supplied. The body portion 21 of the casing is formed with a depression conforming to the lower portion of driver gear 19. The well or sump constituted by the said depression holds a quantity of the lubricant sufficient to keep the lower portion of the said driver gear well covered and coated therewith, and from the well or sump the lubricant is carried by the teeth of the driver gear to the point of interengagement with the driven gear 14, whereby the intermeshing portions of both gears are kept well lubricated.

Referring now to the third feature of the invention, namely the improvement in connection with the adjustment means for the cylinder: This improvement is illustrated in Figs. 3 and 6. As illustrated in the drawings, the upright so-called cylinder of a vertical opener is conical, and is surrounded by and revolves within a correspondingly tapered shell like that indicated at 22 in Fig. 3. The said cylinder is supported in working position by means of a step-bearing 23 for the lower end of the cylinder-shaft 15, and the bolster-bearing 18 for the upper portion of the cylinder-shaft. The said bolster-bearing is mounted conveniently in connection with a fixed support, constituted in the illustrated instance by the top plate 16. To enable the closeness of approach of the extremities of the beater-blades 24, 24, etc., to the inner surface of the shell 22 to be regulated, provision is made for longitudinal adjustment of the cylinder vertically within the shell, namely by making the step 23 vertically adjustable. This is accomplished by mounting the said step movably in connection with the machine-framing and combining with it suitable adjustment devices. In the case of the illustrated construction, the step 23 is placed within the eye or opening of a spider 25, Figs. 3 and 6, having its branches bolted to a fixed support 26 in the lower part of the machine. The step and cylinder are supported vertically, and adjusted vertically, by means of a lever 27 upon which the step rests, and an adjustment-screw 28 having swiveled to its lower end a stirrup 29 through which the lever extends. The outer end-portion of the lever rests upon a cross-pin 30 extending between the side-pieces of the stirrup, and the threaded stem of the screw extends through a hole in a portion 31 of said fixed support 26, the said portion being internally threaded. By means of a hand-wheel 32 upon the top end of the screw the latter is turned to raise or lower the lever, step, and cylinder. A lock-nut 33 which bears against the top of said portion 31 of the said fixed support provides against accidental loss of adjustment.

The adjustment devices which have just been explained are not new, save in the respect hereinafter pointed out. In the case of vertical openers built as heretofore, the adjustment lever 27 for the cylinder projects through and beyond the main casing 17 of the machine, into an exposed position where it and the adjustment hand-wheel, 32, etc., frequently are struck and injured or broken by trucks which are being wheeled past the machine, and by other accidents to which they are exposed. I remedy this disadvantage by locating the lever 27, adjustment-screw 28, and adjustment hand-wheel 32, entirely within the said main casing, as shown in Fig. 3. As thus located, they are out of the way, concealed, and protected. This location of the lever and adjusting devices entirely within the main casing is facilitated through the employment of an adjustment-lever 27 of improved character, namely an adjustment-lever of the second class of levers; that is to say, having, as in the drawings, its load-engaging point located intermediate the lever-fulcrum 91 and the adjustment-screw and hand-wheel. The employment of a lever of the second class enables the lever-fulcrum to be located at the side of said load-engaging point opposite the side of such point where the said adjustment-devices are located. I thereby am enabled to dispose the lever entirely within the diameter of the main casing, while at the same time I render it possible to employ a lever, etc., of proportions suitable for the convenient performance of the functions intended to be subserved.

In practice, the external casing 17 has openings in the side-walls thereof, furnished with doors or removable panels, affording access to the parts which are surrounded by the said casing. Hence, the described adjustment devices are readily accessible for manipulation by the attendant.

What is claimed as the invention is:—

1. In preparing machinery, the combination with an upright or vertical opener, and a bale-breaker delivering fiber to said opener, of a jack-shaft above said opener in positive gear-driving connection with the shaft of the opener cylinder, and driving connections through which the bale-breaker is actuated from the jack-shaft.

2. In preparing machinery, the combination with an upright or vertical opener, and a bale-breaker delivering fiber to said opener, of a jack-shaft above the opener, spiral gears operatively combining the jack-shaft with the shaft of the opener cylinder, whereby the said cylinder is actuated, and band and pulley driving connections through which the bale-breaker is actuated from the jack-shaft.

3. In an opener, the combination with a conical beater "cylinder," a correspondingly shaped shell therefor, and means whereby the cylinder is adjusted lengthwise to regulate the closeness of approach of its beater-arms to the casing, of cylinder-driving means comprising a broad-faced driven spiral gear upon the cylinder-shaft, and a driver spiral gear in driving engagement with the said driven gear.

4. In an upright opener, the combination with a vertical conical "cylinder," a correspondingly shaped shell around said cylinder, and a bearing support that is adjustable vertically to regulate the closeness of approach of the cylinder beater-arms to the said shell, of cylinder-driving means comprising a broad-faced driven spiral gear upon the cylinder-shaft, and a driver spiral gear mounted upon a stationary support.

5. In an upright opener, the combination with a vertical conical "cylinder," a correspondingly shaped shell around said cylinder, and a bearing support that is adjustable vertically to regulate the closeness of approach of the cylinder beater arms to the said shell, of cylinder driving means comprising a broad-faced driven spiral gear upon the cylinder-shaft and a driver spiral gear mounted upon a stationary support, and a casing fitting the said spiral gears and constituting a well for lubricant partly submerging the said gears.

6. The combination, in an upright opener, with an outer casing, a tapered inner shell, a conical beater "cylinder," and a step-bearing for the cylinder, of an outwardly extending adjustment-lever for said step-bearing terminating within the said outer casing, and adjustment means for said lever also enclosed within said outer casing.

7. The combination, in an upright opener, with an outer casing, a tapered inner shell, a conical beater "cylinder," and a step-bearing for the cylinder, of an adjustment-lever for the said step-bearing, of the second class of levers, having its fulcrum at one side of the place of engagement with the step-bearing, and adjustment means located within the enclosure of the outer casing, and engaging with the adjustment lever at the other side of the place of engagement with the step-bearing.

8. In preparing machinery, the combination with an upright or vertical opener, and a bale-breaker delivering fiber to said opener, of a jack-shaft above the opener in positive gear-driving connection with the shaft of the opener cylinder, a motor drive for said jack-shaft, and driving connections through which the bale-breaker is actuated from the jack-shaft.

In testimony whereof I affix my signature in presence of two witnesses.

JOSEPH MOSS.

Witnesses:
GEORGE F. ALBRECHT,
HERMAN NOVA.